March 21, 1944.  E. HOWE  2,344,698
TUBULAR CONNECTION AND SEALING MEANS THEREFOR
Filed Jan. 2, 1943
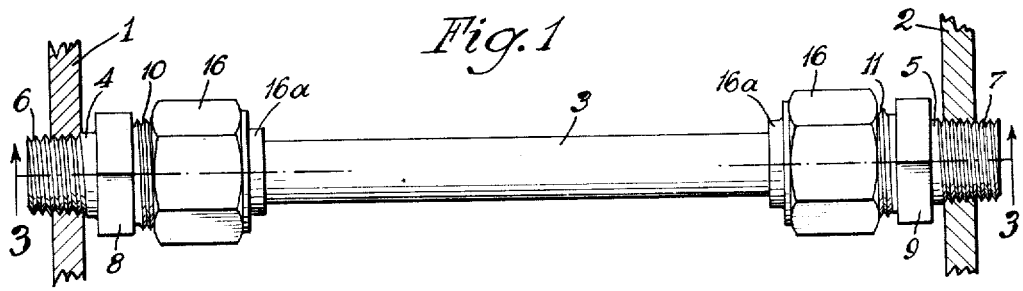
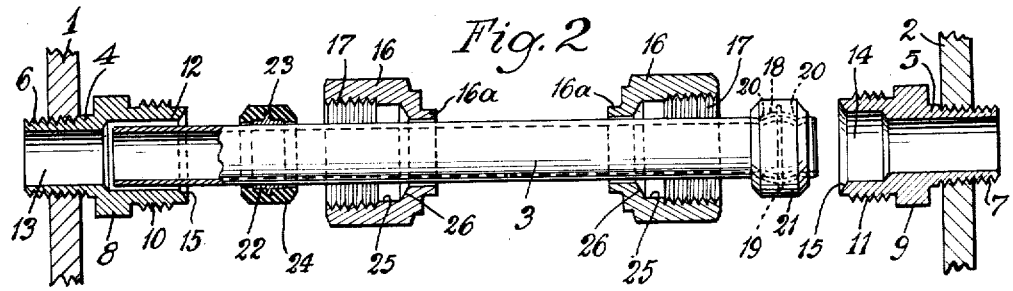
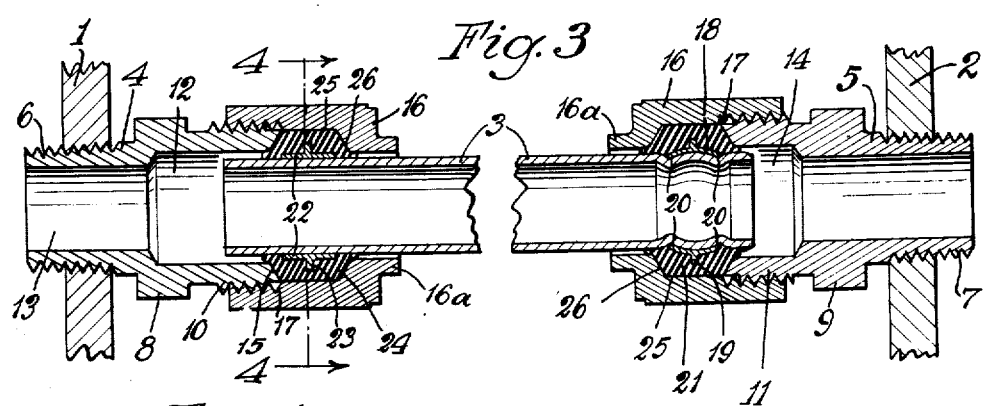
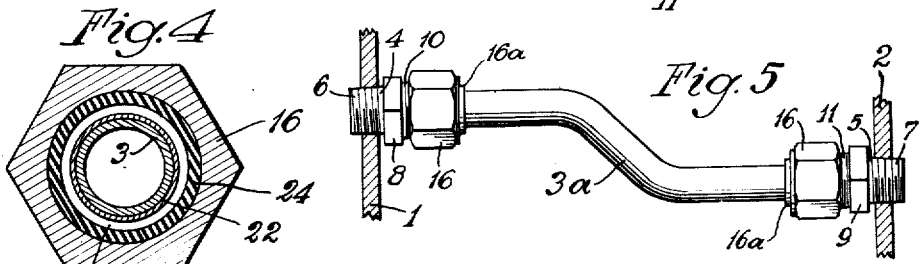
Inventor
Earl E. Howe
by Parker & Carter
Attorneys Patented Mar. 21, 1944

2,344,698

UNITED STATES PATENT OFFICE 2,344,698

TUBULAR CONNECTION AND SEALING MEANS THEREFOR

Earl Howe, Royal Oak, Mich., assignor to Chicago Forging & Manufacturing Company, Chicago, Ill., a corporation of Illinois Application January 2, 1943, Serial No. 471,100

1 Claim. (Cl. 285—2)

My invention relates to an improvement in tube connections and has for one purpose the provision of improved connecting means for tubing or pipes having thin walls. A principal object of my invention is the provision of a fluid tight connection for tubing which is utilizable in connecting tubing extending between fixed or substantially fixed members, such as cylinders, tanks, connections, and the like.

Another purpose is the provision of a fluid tight connection for tubing, which includes a resilient member that provides for a limited universal movement of the tubing, cushioning the tubing against vibration, metal fatigue, and constant danger of breaking the same, while permitting the tubing or connections therefor to be applied between members, the spacing between which is relatively fixed.

Another purpose is the provision of a fluid tight joint for tubing utilizable where the tubing and the joint have to be inserted in a restricted space.

Another purpose is the provision of such a joint which is utilizable with a tubing which has to have an endwise movement imparted to it for its insertion into and removal from the joint area.

Another purpose is the provision of an improved joint in which sealing means are longitudinally movable on the tubing during the application or removal of the joint.

Another purpose is the provision of a joint or a plurality of joints operative for securing a tube to two relatively fixed members, with the ends of the tube, out of axial alignment.

I illustrate my invention more or less diagrammatically in the accompanying drawing, wherein:

Fig. 1 is a side elevation, with parts in section, illustrating the application of the tubing and joints to relatively fixed abutments;

Fig. 2 is an axial section through the structure shown in Fig. 1, with the joints released, and illustrating the necessary movement of the tube preliminary to securing the joints;

Fig. 3 is a section on an enlarged scale taken on the line 3—3 of Fig. 2; illustrating the joints in closed position;

Fig. 4 is a section on the line 4—4 of Fig. 3; and

Fig. 5 is a view similar to Fig. 1 of a variant application of the invention.

Like parts are indicated by like symbols throughout the specification and drawing.

With reference to Figs. 1 to 4, 1 and 2 diagrammatically illustrate members, such as cylinders, tanks, or the like, which will be understood to be at a substantially uniform distance from each other—that is to say—1 and 2 need not be moved toward or away from each other during the application of the joint.

3 is any suitable tubular member, herein shown as a thin walled tube. It will be understood, however, that the present joint may be applied practically to tubes of substantial thickness of wall, as well as to tubes so thin walled as to be delicate and easily deformed.

4, 5 generally illustrate fittings having externally screw threaded end portions 6, 7, screw threaded into apertures in the members 1 and 2, respectively. Each such fitting has an enlarged portion 8, 9, shown in the form of a hexagon, and a generally cylindrical portion 10, 11, extending therefrom on the opposite side of the member 8, 9 from the member 6, 7. Within the portion 8, 10 of the fitting 4 a passage 12 is illustrated as of somewhat greater bore than the passage 13 of the member 6. The corresponding bore 14 of the fitting 5 is shown as shorter and as not extending as far as the hexagon portion 9. The inner end of each fitting terminates in a conic surface 15.

Slidable on the member 3 are two hollow nuts 16, which may be identical but reversed, as shown in Fig. 2. They include an inwardly screw threaded portion 17 adapted to mesh with the external screw threads of the members shown in 10 and 11.

At the right hand end of the tube 3 a ferrule 18 is illustrated, having a circumferential outwardly extending fin or rib 19. The edges of the ferrule are shown as crimped into the wall of the tube, as at 20. It will be understood, however, that any suitable means may be applied for securing the ferrule against movement in relation to the end of the tube 3 to which it is applied. This ferrule is illustrated in my application Serial No. 416,235, filed October 23, 1941, which issued as Patent No. 2,301,280, on November 10, 1942. A method of applying such a ferrule to the joint, and a tool for applying it are shown in my co-pending application Serial No. 464,183, filed November 2, 1942.

It will be understood, however, that any suitable means may be employed for fixing the outwardly extending rib 19, or its equivalent, to the tube. In fact, the tube itself may be crimped or deformed to provide an outward projection. Surrounding the ferrule 18 and the rib 19 is a mass of flexible distortable material of rubber, or preferably a rubber substitute, illustrated at 21. It is anchored in position on the tube 3 by the rib 19 of the ferrule. It may surround the ferrule proper, or, as shown in Fig. 2, it may be of sufficient axial length to surround adjacent parts of the tube.

At the opposite end of the tube I illustrate a sliding ferrule 22, with its rib 23 and its surrounding mass or ring 24 of flexible distortable material. It will be understood that the ferrule and the rib, while snugly fitting about the tube, may slide longitudinally in relation to the tube when the joint is released. It will be understood that in applying the tube 3 and its joints to the permanently spaced fittings 4 and 5, the left end of the tube can readily be moved into the bore 12 of the fitting 4, far enough to permit the opposite end of the tube 3, with its ferrule and compressible washer already in position, to be aligned with the inner end of the fitting 5. The tube 3 is then moved to the right until the washer 21 engages the conic surface 15 of the fitting. The nut 16 is then moved into position and threaded on the portion 11 of the fitting. The parts are preferably so proportioned that, when the member 16 reaches its end or closed position, as shown in Fig. 3, the flexible distortable mass 21 is subjected to very substantial pressure and entirely fills the pressure chamber formed by the conic surface 15, the inner wall 25 of the nut 16, the conic wall 26 of the inner end of the nut 16, and the ferrule and adjacent parts of the tube.

To close the opposite joint, the ferrule 22 and its surrounding washer or mass of flexible distortable material 24 is slid along the tube until the washer engages the conic surface 15 of the fitting 4. Then the nut 16 is tightened, and the flexible distortable mass 24 fills the pressure chamber of the last mentioned fitting. The only difference between the two joints is that the ferrule is slidable on the end of the tube. But this makes no difference as the tube 3 itself is anchored by the first mentioned joint, and the mass of flexible distortable material 24 of the second is firmly compressed between the nut 16 and the fitting 4, which is anchored to the member 1. It will be understood that any internal pressure against the inner end of the second joint will not cause the joint to blow out and will not weaken the joint, as the assembly as a whole is firmly anchored to the member 1.

It is advantageous, but not absolutely necessary, to employ the ferrule in connection with the second joint. If a thin walled tube is used, then the ferrule serves as a reinforcement to prevent the heavily compressed flexible distortable mass 24 from collapsing the tube. The fin or rib of the ferrule also being preferably of greater radial extension than the diameter of the aperture of the nut 16 through which the tube 3 passes, the mass between the fin and the inner end of the tapered wall 26 of the nut 16 is under direct compression. The mass is not under shear, and in practice, if the entire connection is subjected to a destruction test, the tube will give before either joint will.

Referring to the form of Fig. 5, the structure is identical, except that in the place of the rectilinear tube 3, of the earlier figures, a bend tube 3a is employed. The parts are otherwise identically numbered. It will be noted that the sliding joint can be applied at either end of the tube 3a as long as an anchored joint is applied to the other end. The two joints are out of axial alignment.

It will be realized that, whereas I have described and illustrated a practical and operative device, nevertheless many changes may be made in the size, shape, number and disposition of parts without departing from the spirit of my invention. I wish, therefore, the drawing and description to be taken as in a broad sense illustrative or diagrammatic, rather than as limiting me to my precise showing.

The use and operation of my invention are as follows:

It often happens, for example in internal combustion engine practice, that a tubular connection may advantageously be inserted between relatively fixed elements. The connection and joint herein described is adapted for use in such restricted spaces.

Referring to the position of the parts, for example in Figs. 1 to 3, the right-hand joint includes the mass of flexible distortable material 21, which is anchored on the end of the tube itself in any suitable manner, for example by the ferrule 18, with its outwardly extending rib 19. When the member 21 is compressed between the opposed pressure chamber members formed by the elements 11 and 16, the tube 3 is thereby anchored against longitudinal movement in relation either to the member 2 or to the member 1. The tube 3 may theoretically be slidable in relation to the left-hand joint, but since the left-hand joint itself is anchored on the member 1, and since the tube 3 is anchored in relation to the member 2, there can be no slippage. However, slippage is permitted as soon as the members 16 are released. Not only is the left-hand member 16 slidable on the tube 3, but the ferrule 22 and the mass of flexible distortable material as well. This permits all movable parts of the joint to be slipped back from the left-hand end of the tube 3, so that the tube 3 can be inserted in the bore 12 far enough to permit the opposite end of the tube to be aligned with the fitting 5 and to penetrate slightly into the bore of the portion 11 of that fitting, which is the position the tube takes when both joints are secured.

I have illustrated the bore 12 of the left-hand joint as of greater length than the corresponding bore in the right-hand joint. It will be understood, of course, that, if desired, identical fittings may be employed. All that is necessary is that the bore of one or both of the fittings shall be of sufficient length to permit the tube 3 to be slid far enough into it to permit the opposite end to clear the edge of the opposite fitting. In effect, and referring to Fig. 2, the cavity of the member 5 is made of excess length, of a length greater than is necessary for its function in connection with the completed joint. This excess length permits the end of the tube 3 to be inserted far enough, as shown in Fig. 2, to allow the opposite end of the tube 3 to clear the opposite fitting 9. This is important, since the fittings 5 and 9, are secured in final position in relation to the abutments 1 and 2 before the application to them of the tube 3.

Referring to Fig. 5, it will be realized that the joint shown herein is well adapted for use with tubes having one end offset in relation to the other. It is advantageous that the tube include a straight stretch for the sliding ferrule 22 to slide on. But even an arcuate or curved end portion may be employed if the ferrule is correspondingly formed or is provided with additional clearance.

Of course, under some circumstances, the ferrule may be dispensed with.

It will be further understood that preferably the parts are so formed as to permit a reasonable flexure of the joint. This may be of little importance where the parts 1 and 2 are rigidly fixed in relation to each other but if there is any play between them or any shifting in a plane generally perpendicular to the axis of the tube 3, a measure of flexure may be desirable. The nuts 16 are shown as having an extending collar or angular flange 16a. If this flange interferes with the flexure of the joint it can be shortened or entirely omitted.

I claim:

In a tubular connection between a pair of relatively fixed members, a tube having a smooth generally cylindrical exterior, the tube being of a length adapted for simultaneous engagement with both fixed members, a mass of flexible distortable material anchored to the exterior of one end of the tube, a mass of flexible distortable material slidable in relation to the opposite end of the tube, joint forming means for each end of the tube including a housing element associated with each of the fixed members and adapted to surround an end of the tube and a pair of complementary housing elements mounted on the tube, and means for locking each said housing element on the tube in relation to the housing element on one of the relatively fixed members, for thereby defining chambers surrounding each of said masses of flexible distortable material, the mass of flexible distortable material which is anchored to one end of the tube preventing movement of the tube in relation to the housing formed about the opposite end of the tube.

EARL HOWE.